(12) United States Patent
Blacker et al.

(10) Patent No.: US 7,964,284 B2
(45) Date of Patent: *Jun. 21, 2011

(54) LOW-E COATED ARTICLES AND METHODS OF MAKING SAME

(75) Inventors: Richard Blacker, Farmington Hills, MI (US); Brent Boyce, Novi, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/654,594

(22) Filed: Dec. 23, 2009

(65) Prior Publication Data

US 2010/0104840 A1    Apr. 29, 2010

Related U.S. Application Data

(63) Continuation of application No. 11/724,327, filed on Mar. 15, 2007, now Pat. No. 7,655,313.

(51) Int. Cl.
*B32B 17/06* (2006.01)
*B32B 15/04* (2006.01)

(52) U.S. Cl. ........ 428/432; 428/469; 428/336; 428/448; 428/450; 428/699; 428/689; 428/698; 428/701; 428/702

(58) Field of Classification Search .................. None
See application file for complete search history.

(56) References Cited

U.S. PATENT DOCUMENTS

| | | | |
|---|---|---|---|
| 5,376,455 A | 12/1994 | Hartig et al. | |
| 5,514,476 A | 5/1996 | Hartig et al. | |
| 5,688,585 A | 11/1997 | Lingle et al. | |
| 5,800,933 A | 9/1998 | Hartig et al. | |
| 6,475,626 B1 | 11/2002 | Stachowiak | |
| 6,495,263 B2 | 12/2002 | Stachowiak | |
| 6,749,941 B2 | 6/2004 | Lingle | |
| 6,782,718 B2 | 8/2004 | Lingle et al. | |
| 7,122,252 B2 | 10/2006 | Hoffman | |
| 7,138,182 B2 | 11/2006 | Krisko et al. | |
| 7,655,313 B2 | 2/2010 | Blacker et al. | |
| 2003/0175527 A1 | 9/2003 | Lingle | |
| 2005/0123772 A1* | 6/2005 | Coustet et al. | 428/432 |
| 2006/0046073 A1 | 3/2006 | Neuman et al. | |
| 2007/0082206 A1 | 4/2007 | Hartig | |

FOREIGN PATENT DOCUMENTS

EP    0 560 534    9/1993

(Continued)

OTHER PUBLICATIONS

U.S. Appl. No. 11/724,327, filed Mar. 15, 2007; Blacker et al.

*Primary Examiner* — Ling Xu
(74) *Attorney, Agent, or Firm* — Nixon & Vanderhye P.C.

(57) ABSTRACT

In certain example embodiments, low-E coated articles may be designed so as to realize a combination of good visible transmission ($T_{vis}$) and an excellent solar heat gain coefficient (SHGC), thereby realizing an improved (i.e., higher) $T_{vis}$/SHGC ratio. In certain example embodiments of this invention, if heat treated (HT), the low-E coated articles may have approximately the same color characteristics as viewed by the naked eye both before and after heat treatment (i.e., a low ΔE* value) in certain example instances. Such coated articles may be used in insulating glass (IG) units, windows, and/or other suitable applications.

8 Claims, 2 Drawing Sheets

FOREIGN PATENT DOCUMENTS

| | | |
|---|---|---|
| EP | 0 567 735 | 11/1993 |
| EP | 1 734 019 | 12/2006 |
| ES | 2 111 824 | 3/1998 |
| ES | 2 122 755 | 12/1998 |
| ES | 2 123 892 | 1/1999 |
| ES | 2 125 920 | 3/1999 |
| WO | WO 03/048061 | 6/2003 |

* cited by examiner

|   |   |   |   | Ex. 1 | | Ex. 2 | | Ex. 3 | | Ex. 4 | |
|---|---|---|---|---|---|---|---|---|---|---|---|
|   |   |   |   | AG-53 A | | AG-53 B | | AG-53 C | | AG-53 D | |
|   |   |   |   | Mono | IGU | Mono | IGU | Mono | IGU | Mono | IGU |
|   | SiN Overcoat |   |   | 48.4 |   | 49.5 |   | 47.9 |   | 49.5 |   |
|   | NiCr Overcoat |   |   | 2.0 |   | 1.5 |   | 2.0 |   | 1.5 |   |
|   | Ag |   |   | 14.3 |   | 15.7 |   | 13.8 |   | 15.5 |   |
|   | NiCr or ZnO (Z) |   |   | 2.0 |   | 1.5 |   | 2.0 |   | 1.5 |   |
|   | SiN Undercoat |   |   | 29.1 |   | 25.2 |   | 29.8 |   | 27.8 |   |
|   | TiO2 |   |   |   |   |   |   |   |   |   |   |
| Rg | Y |   |   | 20.6 | 23.2 | 23.5 | 26.1 | 19.3 | 22.0 | 22.0 | 24.8 |
|   | L* |   |   | 52.6 | 55.3 | 55.6 | 58.2 | 51.1 | 54.0 | 54.1 | 56.9 |
|   | a* |   |   | 0.3 | -1.1 | 0.0 | -1.3 | 0.4 | -1.0 | 0.2 | -1.2 |
|   | b* |   |   | -5.1 | -4.8 | -5.0 | -4.5 | -5.7 | -5.2 | -5.2 | -4.7 |
| T | Y |   |   | 55.4 | 49.6 | 56.1 | 50.4 | 56.5 | 50.6 | 57.4 | 51.5 |
|   | L* |   |   | 79.3 | 75.8 | 79.7 | 76.3 | 79.9 | 76.4 | 80.4 | 77.0 |
|   | a* |   |   | -4.2 | -5.6 | -4.0 | -5.4 | -4.1 | -5.6 | -4.1 | -5.5 |
|   | b* |   |   | 0.0 | 0.0 | 1.2 | 1.2 | -0.3 | -0.2 | 1.2 | 1.1 |
| Rf | Y |   |   | 7.4 | 13.9 | 10.6 | 16.5 | 6.5 | 13.2 | 9.9 | 15.9 |
|   | L* |   |   | 32.6 | 44.0 | 38.9 | 47.6 | 30.6 | 43.0 | 37.6 | 46.8 |
|   | a* |   |   | 14.2 | 6.0 | 10.5 | 4.5 | 15.0 | 6.1 | 0.2 | 4.6 |
|   | b* |   |   | -17.6 | -10.5 | -16.1 | -10.5 | -17.6 | -10.1 | -16.8 | -10.8 |
|   |   |   |   |   |   |   |   |   |   |   |   |
|   | T780 |   |   | 32.9 |   | 32.8 |   | 33.9 |   | 33.9 |   |
|   | Tsolar |   |   |   | 27.2 |   | 27.2 |   | 27.9 |   | 27.8 |
|   | U-Value |   |   |   | 0.304 |   | 0.307 |   | 0.313 |   | 0.308 |
|   | SHGC |   |   |   | 0.332 |   | 0.328 |   | 0.341 |   | 0.335 |

*Fig. 3*

LOW-E COATED ARTICLES AND METHODS OF MAKING SAME

This application is a Continuation of application Ser. No. 11/724,327, filed Mar. 15, 2007 now U.S. Pat. No. 7,655,313, the entire content of which is hereby incorporated herein by reference in this application.

Certain example embodiments of this invention relate to low-E (low emissivity) coated articles. In certain example embodiments of this invention, the low-E coated articles may or may not be heat treated (e.g., thermally tempered, heat bent, or heat strengthened). In certain example embodiments of this invention, the low-E coated articles may be designed so as to realize a combination of good visible transmission ($T_{vis}$) and an excellent solar heat gain coefficient (SHGC) so has to have an improved (i.e., higher) $T_{vis}$/SHGC ratio. In certain example embodiments of this invention, if heat treated (HT), the low-E coated articles may have approximately the same color characteristics as viewed by the naked eye both before and after heat treatment (i.e., a low ΔE* value) in certain example instances. Such coated articles may be used in insulating glass (IG) units, windows, and/or other suitable applications.

BACKGROUND OF THE INVENTION

Coated articles are known in the art for use in window applications such as insulating glass (IG) window units, vehicle windows, and/or the like. In certain situations, designers of coated articles may strive for a combination of good visible transmission, low emissivity (or emittance), and blockage of undesirable radiation such as infrared (IR) radiation to prevent or reduce undesirable heating of building or vehicle interiors. High visible transmission for example may permit coated articles to be more desirable in certain window applications, whereas low emissivity (low-E), low SHGC (solar heat gain coefficient), and low SF (solar factor, or g-value) characteristics permit coated articles to block significant amounts of undesirable radiation so as to reduce, for example, undesirable heating of building or vehicle interiors. SF, calculated in accordance with DIN standard 67507 or EN410:1998, relates to a ratio between the total energy entering a room or the like through a glazing and the incident solar energy. Thus, it will be appreciated that low SF values are indicative of good solar protection against undesirable heating of rooms or the like protected by windows/glazings. For example, a low SF value is indicative of a coated article that is capable of keeping a room fairly cool in summertime months during hot ambient conditions. Moreover, the SHGC of an article/window is the fraction of incident solar radiation that is admitted through the article/window (e.g., see NFRC 100-2001 hereby incorporated herein by reference).

Solar control coating systems are known. For example, commonly owned U.S. Pat. No. 5,688,585 discloses a solar control coated article including: glass/$Si_3N_4$/NiCr/$Si_3N_4$. One object of the '585 patent is to provide a sputter coated layer system that after heat treatment is matchable colorwise with its non-heat treated counterpart. While the coating systems of the '585 patent are excellent for their intended purposes, they suffer from certain disadvantages. In particular, they tend to have rather high emissivity values (e.g., because no silver (Ag) layer is disclosed in the '585 patent).

Low-emissivity (low-E) coating systems are also known in the art. For example, commonly owned U.S. Pat. No. 6,475,626 (hereby incorporated herein by reference) discloses: glass/$Si_3N_4$/NiCr/Ag/NiCr/$Si_3N_4$. Low-E coating systems of the '626 Patent provide good visible transmission and low-E characteristics. However, coating systems of the '626 Patent cannot achieve a combination of good visible transmission ($T_{vis}$) and good solar heat gain coefficient (SHGC). In other words, the coating systems of the '626 Patent have undesirably low $T_{vis}$/SHGC ratios. For instance, Example 1 of the '626 Patent in the context of an insulating glass (IG) unit was only able to realize a $T_{vis}$/SHGC ratio of about 128. As another example, Example 2 of the '626 Patent in the context of an insulating glass (IG) unit was only able to realize a $T_{vis}$/SHGC ratio of about 127, and Example 2 of the '626 Patent monolithically was only able to realize a $T_{vis}$/SHGC ratio of about 114.

U.S. Pat. No. 6,782,718 also discloses glass/$Si_3N_4$/NiCr/Ag/NiCr/$Si_3N_4$. However, the coating systems of the '718 Patent have undesirably low $T_{vis}$/SHGC ratios. For instance, the Example in column seventeen of the '718 Patent in the context of an insulating glass (IG) unit was only able to realize a $T_{vis}$/SHGC ratio of about 127 (heat treated or HT) or 123 (not HT).

U.S. Pat. No. 5,800,933 discloses another example coated article. However, coated articles of the '933 Patent have undesirably high SHGC values thereby indicating inefficient solar protection against undesirable heating of rooms or the like.

The need for matchability (before heat treatment vs. after heat treatment) is also known with respect to coated articles. Glass substrates are often produced in large quantities and cut to size in order to fulfill the needs of a particular situation such as a new multi-window and door office building, vehicle windshield needs, etc. It is often desirable in such applications that some of the windows and/or doors be heat treated (i.e., tempered, heat strengthened or bent) while others need not be. Office buildings often employ IG units and/or laminates for safety and/or thermal control. It is desirable that the units and/or laminates which are heat treated substantially match their non-heat treated counterparts (e.g., with regard to color, reflectance, and/or the like, at least on the glass side) for architectural and/or aesthetic purposes. U.S. Pat. Nos. 6,014,872 and 5,800,933 (see Example B) disclose a heat treatable low-E layer system including: glassTiO_2/$Si_3N_4$/NiCr/Ag/NiCr/$Si_3N_4$. Unfortunately, when heat treated this low-E layer system is not approximately matchable colorwise with its non-heat treated counterpart (as viewed from the glass side). This is because this low-E layer system has a ΔE* (glass side) value of greater than 4.1 (i.e., for Example B, Δa*$_G$ is 1.49, Δb*$_G$ is 3.81, and ΔL* (glass side) is not measured; using Equation (1) below then ΔE* on the glass side must necessarily be greater than 4.1 and is probably much higher than that).

Some have attempted to lower SHGC values by providing multiple silver layers in a coating (e.g., low-E coated articles with two silver IR reflecting layers). E.g., see U.S. Pat. No. 7,138,182. However, this is sometimes undesirable in that the coating is more expensive and time consuming to make, and may also suffer from certain durability issues due to the addition of the second silver layer. Thus, it is sometimes desirable to avoid the need for two silver layers in a coating. Moreover, certain coatings with multiple silver layers are difficult to make while maintaining the ability to achieve matchability upon heat treatment (i.e., low ΔE* values).

Others have attempted to lower SHGC values, but this has come at the expense of lower visible transmission values. For example, a currently coating has a stack of: glass/$Si_3N_4$(14.3 nm)/NiCr(3.8 nm)/Ag(10.6 nm)/NiCr(2.4 nm)/$Si_3N_4$(48.4 nm). While this coated article has a glass side ΔE* value of less than 2 (monolithic) and a SHGC value of 0.35 (monolithic) or 0.30 (IG unit), it can only achieve a visible transmission of 48.4% (monolithic) or 43.4% (IG unit). Accordingly, its $T_{vis}$/SHGC ratio is only 138 (monolithic), or 144 (IG, with a low visible transmission of 43.4%). As another example, the double-silver coatings of U.S. Pat. No. 7,138, 182 realize a low SHGC, but at the expense of low visible transmission. Thus, the '182 coatings are undesirable in that they both: require two silver layers, and sacrifice visible transmission in order to realize a low SHGC.

In view of the above, it will be apparent to those skilled in the art that there exists a need for a coating or layer system that could satisfy solar control and low-E requirements, visible transmission desires, and ease of manufacturability. In particular, it will be appreciated that there exists a need in the art for a low-E coating, which requires only one silver layer in certain example embodiments, and which can achieve a high visible transmission ($T_{vis}$) together with a relatively low solar heat gain coefficient (SHGC) so has to have an improved (i.e., higher) $T_{vis}$/SHGC ratio. These features may be provided in the monolithic and/or IG unit contexts.

In certain example embodiments, the coated article if heat treated may also have a low ΔE* value indicating thermal stability upon heat treatment (HT). In other words, there may also exist a need in the art for a low-E coating or layer system which after optional heat treatment substantially matches in color and/or reflection (e.g., as viewed by a naked human eye from the glass side) its non-heat treated counterpart.

SUMMARY OF EXAMPLE EMBODIMENTS OF THE INVENTION

Certain example embodiments of this invention relate to low-E (low emissivity) coated articles. In certain example embodiments of this invention, the low-E coated articles may or may not be heat treated (e.g., thermally tempered, heat bent, or heat strengthened).

In certain example embodiments of this invention, the low-E coated articles may be designed so as to realize a combination of good visible transmission ($T_{vis}$) and an excellent solar heat gain coefficient (SHGC) so has to have an improved (i.e., higher) $T_{vis}$/SHGC ratio. In certain example embodiments, a low-E coated article may have a $T_{vis}$/SHGC ratio of at least 140, more preferably of at least 145, even more preferably of at least 150 or 153. Moreover, in certain example embodiments of this invention, the coated article may have an SHGC value of no greater than 0.36, more preferably no greater than 0.35, even more preferably no greater than 0.34 or 0.33. In certain example embodiments of this invention, the coated article may have a visible transmission ($T_{vis}$) of from about 40-65%, more preferably from about 45-60%, and most preferably from about 48-57% or from about 49-56%.

In certain example embodiments of this invention, if heat treated (HT), the low-E coated articles may have approximately the same color characteristics as viewed by the naked eye both before and after heat treatment (i.e., a low ΔE* value) in certain example instances. Such coated articles may be used in insulating glass (IG) units, windows, and/or other suitable applications. In certain example embodiments, the coated article may have a glass side reflective ΔE* value of no greater than about 3.0, more preferably no greater than about 2.75, even more preferably no greater than about 2.5, and possibly no greater than about 2.25 or 2.0.

In certain example embodiments of this invention, there is provided an insulating glass (IG) window unit comprising: first and second glass substrates coupled to each other proximate their respective edges so as to form an insulating space therebetween; a layer system supported by one of the glass substrates proximate the insulating space, said layer system comprising an infrared (IR) reflecting layer comprising silver located between at least first and second dielectric layers, wherein said layer system includes only one IR reflecting layer comprising silver (or gold, or platinum); and wherein the IG window unit has a visible transmission ($T_{vis}$) of 47-60%, a SHGC of no greater than 0.36, and a $T_{vis}$/SHGC ratio of at least 140.

In other example embodiments of this invention, there is provided a coated article comprising: a coating supported by a glass substrate, said coating comprising an infrared (IR) reflecting layer comprising silver located between at least first and second dielectric layers, wherein said coating includes only one IR reflecting layer comprising silver; and wherein the coated article measured monolithically has a visible transmission ($T_{vis}$) of 50-65%, a SHGC of no greater than 0.41, and a $T_{vis}$/SHGC ratio of at least 140.

A method of making such a coated article may also be provided, where each of the layers may be sputter-deposited or otherwise deposited on the glass substrate, and optionally thereafter the glass substrate with the coating thereon may be heat treated (e.g., thermally tempered).

IN THE DRAWINGS

FIG. 3 is a chart setting forth data of Examples 1-4 according to example embodiments of this invention, based on modeling.

DETAILED DESCRIPTION OF CERTAIN EXAMPLE EMBODIMENTS OF THE INVENTION

Figure 1:
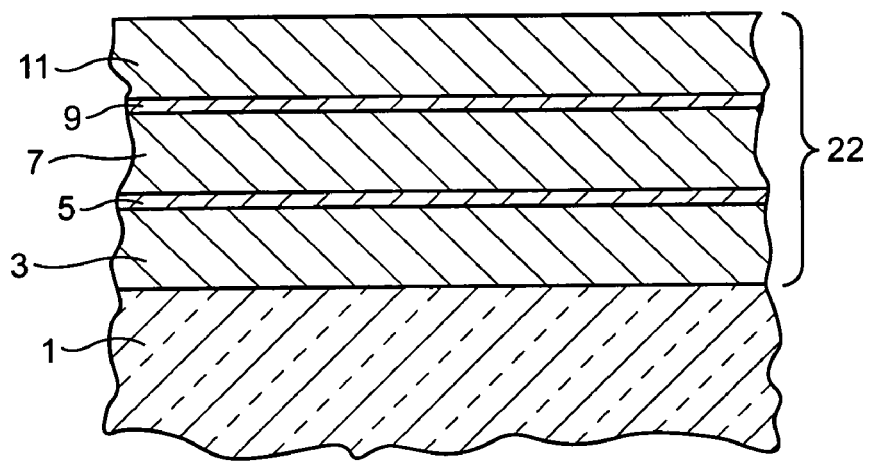
FIG. 1 is a partial side cross sectional view of an embodiment of a layer system according to this invention.

Certain embodiments of this invention provide a coating or layer system that may be used in applications such as IG units, vehicle windows, vehicle windshields, and other suitable applications. Certain example embodiments of this invention relate to low-E (low emissivity) coated articles. In certain example embodiments of this invention, the low-E coated articles may or may not be heat treated (e.g., thermally tempered, heat bent, or heat strengthened). In certain example embodiments of this invention, the low-E coated articles may be designed so as to realize a combination of good visible transmission ($T_{vis}$) and an excellent solar heat gain coefficient (SHGC) so has to have an improved (i.e., higher) $T_{vis}$/SHGC ratio. This ratio may be called a light to solar gain ratio in certain instances. In certain example embodiments, a low-E coated article may have a $T_{vis}$/SHGC ratio of at least 140, more preferably of at least 145, even more preferably of at least 150 or 153. In the event that visible transmission ($T_{vis}$) is expressed in decimal terms (e.g., 0.60 instead of 60%), then these $T_{vis}$/SHGC ratios would be considered at least 1.40, more preferably of at least 1.45, even more preferably of at least 1.50 or 1.53. Moreover, in certain example embodiments of this invention, the coated article may have an SHGC value of no greater than 0.36, more preferably no greater than 0.35, even more preferably no greater than 0.34 or 0.33. In certain example embodiments of this invention, the coated article may have a visible transmission ($T_{vis}$) of from about 40-65%, more preferably from about 45-60%, and most preferably from about 48-57% or from about 49-56%. The above data may be in the context of an IG unit and/or monolithic in different example embodiments of this invention.

In certain example embodiments of this invention, if heat treated (HT), the low-E coated articles may have approximately the same color characteristics as viewed by the naked eye both before and after heat treatment (i.e., a low ΔE* value) in certain example instances. Certain embodiments of this invention provide a layer system that has excellent color stability (i.e., a low value of ΔE* and/or a low value of Δa*; where Δ is indicative of change in view of heat treatment) with heat treatment (e.g., thermal tempering, bending, or thermal heat strengthening) monolithically and/or in the context of dual pane environments such as IG units or windshields. Such heat treatments often necessitate heating the coated substrate to temperatures above 1100° F. (593° C.) and up to 1450° F. (788° C.) [more preferably from about 1100 to 1200 degrees F.] for a sufficient period of time to insure the end result (e.g., tempering, bending, and/or heat strengthening). Certain embodiments of this invention combine both color stability with heat treatment, and the use of a single silver layer for selective IR reflection. In certain example embodiments, the coated article may have a glass side reflective ΔE* value of no greater than about 3.0, more preferably no greater than about 2.75, even more preferably no greater than about 2.5, and possibly no greater than about 2.25 or 2.0.

FIG. 1 is a side cross sectional view of a coated article according to an example embodiment of this invention. The coated article includes substrate 1 (e.g., clear, green, bronze, grey, blue, or blue-green glass substrate from about 1.0 to 12.0 mm thick, e.g., about 6 mm thick), first dielectric layer 3 (e.g., of or including silicon nitride (e.g., $Si_3N_4$), titanium dioxide, titanium nitride, zirconium oxide, zirconium nitride, tin oxide, silicon oxide, silicon dioxide, silicon oxynitride, or zinc oxide), metallic or substantially metallic nickel (Ni) or nickel-chrome (NiCr) inclusive layer 5 (other oxidation resistant materials may be used instead of Ni or NiCr in alternative embodiments of this invention), metallic or substantially metallic IR reflecting silver (Ag) based layer 7, metallic or substantially metallic nickel (Ni) or nickel-chrome (NiCr) inclusive layer 9 (other oxidation resistant materials may be used instead of Ni or NiCr in alternative embodiments of this invention), and second dielectric layer 11 (e.g., of or including silicon nitride (e.g., $Si_3N_4$), titanium dioxide, titanium nitride, zirconium nitride, zirconium oxide, tin oxide, silicon oxide, silicon dioxide, silicon oxynitride, or zinc oxide). Other layer(s) below or above the illustrated coating system may also be provided. Thus, while the layer system is "on" or "supported by" substrate 1 (directly or indirectly), other layer(s) may be provided therebetween. Thus, for example, the layer system of FIG. 1 may be considered "on" the substrate 1 even though other layer(s) may be provided therebetween.

IR reflecting Ag layer 7 is preferably Ag metal, although it is possible that some small amount of oxidation could occur with respect thereto. The same is true for Ni or NiCr layers 5 and 9. Thus, in certain preferred embodiments of this invention, layers 5, 7 and 9 are no more than about 25% oxidized, more preferably no more than about 10% oxidized, and most preferably no more than about 1, 2 or 4, or even up to 7-8% oxidized and/or nitrided. In certain preferred embodiments, layers 5 and/or 9 are of non-nitrided and nonoxidized nickel or nickel alloy (e.g., nichrome of, by weight percent, 80/20 nickel/chrome). Layers 3, 5, 7, 9 and 11 may be deposited on the glass substrate via sputtering, or via any other suitable technique.

In embodiments of this invention where layers 3 and 11 comprise silicon nitride (e.g., $Si_3N_4$ or any other suitable stoichiometry), a target including Si employed to form these layers may be admixed with up to 6-20% by weight aluminum or stainless steel (e.g. SS#316), with about this amount then appearing in the layers so formed. Moreover, while layers 5 and 9 may be metallic nickel, a nichrome preferably consisting essentially of, by weight about 80-90% Ni and 10-20% Cr (or 50/50 Ni/Cr), may be employed in certain example embodiments. Other metals or alloys may also be used in alternative embodiments, e.g., alloy(s) include 10% or more Ni. Moreover, while it is possible to employ certain other IR reflecting metals as layer 7, such as gold or platinum, in certain embodiments of this invention, layer 7 herein consists essentially of metallic silver in certain embodiments of this invention. An example of layers 5 and 9 includes not only SS-316 which consists essentially of 10% Ni and 90% other ingredients, mainly Fe and Cr, but Haynes 214 alloy as well, which by weight consists essentially of (as a nominal composition):

| Element | Weight % |
|---|---|
| Ni | 75.45 |
| Fe | 4.00 |
| Cr | 16.00 |
| C | .04 |
| Al | 4.50 |
| Y | .01 |

Figure 2:
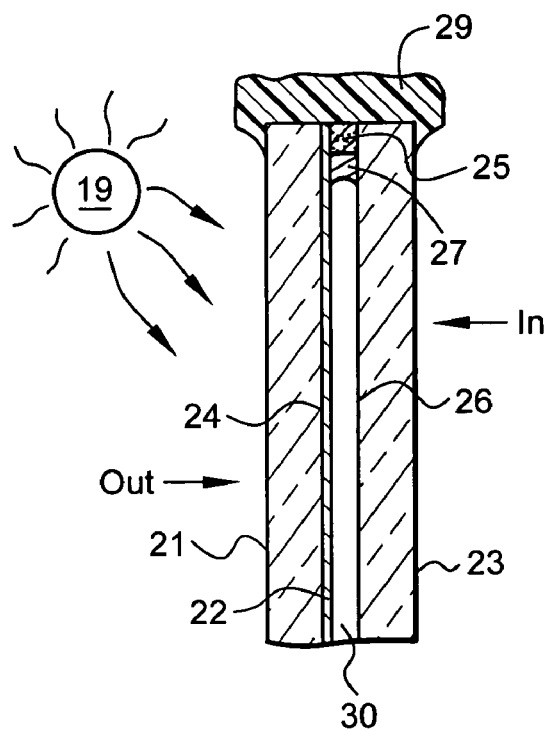
FIG. 2 is a partial cross-sectional view of an IG unit as contemplated by an example embodiment of this invention, in which the layer system of FIG. 1 may be used.

FIG. 2 illustrates the coating or layer system 22 of FIG. 1 being utilized on surface #2 of an IG window unit. In order to differentiate the "inside" of the IG unit (and inside of the building in which the unit is mounted) from its "outside", the sun 19 is schematically presented in FIG. 2 on the outside. The IG unit includes outside glass pane or sheet 21 (or 1) and inside glass pane or sheet 23. These two glass substrates (e.g. float glass 2 mm to 12 mm thick) are sealed at their peripheral edges by a sealant 25 or the like, and may be provided with a conventional desiccant strip 27. The panes are then retained in a conventional window or door retaining frame (shown in partial schematic form). By sealing the peripheral edges of the glass sheets and replacing the air in insulating space (or chamber) 30 with a gas such as argon, a typical, high insulating value IG unit is formed. Optionally, insulating space 30 may be at a pressure less than atmospheric pressure in certain alternative embodiments, although this of course is not necessary in all embodiments. Either inner wall 24 or 26 (or both) may be provided with a coating 22 (see FIG. 1) of this invention. In this illustrated embodiment of FIG. 2, inner wall 24 (i.e., surface #2) of outside glass sheet 21 has been provided with a sputter-coated layer system of FIG. 1 thereon.

Turning back to FIG. 1, while various thicknesses may be used consistent with one or more of the objects and/or needs discussed herein, according to certain exemplary embodiments of this invention, the preferred thicknesses and materials for the respective layers on the glass substrate 1 are as follows (note that stoichiometries such as $Si_3N_4$ are used for purposes of example only and without limitation):

TABLE 1

(Example Approximate Thicknesses in Angstroms)

| Layer | Preferred Range (Å) | More Preferred (Å) | Example (Å) |
|---|---|---|---|
| $Si_3N_4$ (layer 3) | 150-900 Å | 200-350 Å | 230-320 Å |
| NiCr (layer 5) | 10-80 (or 10-40) Å | 15-40 Å | 17-30 Å |
| Ag (layer 7) | 90-200 Å | 125-180 Å | 135-170 Å |

TABLE 1-continued (Example Approximate Thicknesses in Angstroms)

| Layer | Preferred Range (Å) | More Preferred (Å) | Example (Å) |
|---|---|---|---|
| NiCr (layer 9) | 10-80 (or 10-40) Å | 15-40 Å | 17-30 Å |
| $Si_3N_4$ (layer 11) | 400-600 Å | 450-560 Å | 465-540 Å |

As can be seen from Table 1 above, compared to examples in U.S. Pat. No. 6,475,626 for instance, the Ag layer 7 has been thickened, the top silicon nitride layer 11 has been thickened, and the bottom silicon nitride layer 3 may be thinned. The NiCr layers have also been thinned. An example excellent thickness range for layer 5 and/or 9 is from about 18-23 angstroms. Surprisingly, it is believed that one or more of these changes results an improved (higher) $T_{vis}$/SHGC ratio without significantly sacrificing visible transmission or ΔE* values in optional heat treated embodiments. Note that the thicknesses are physical thicknesses.

Low ΔE* values are indicative of thermal stability upon heat treatment (HT) such as thermal tempering, heat bending, or the like. The way in which ΔE* values are calculated is set forth in U.S. Pat. No. 6,475,626, which is incorporated herein by reference. In other words, in monolithic and/or IG applications, low glass side reflective ΔE* values indicate that two glass substrates having the same coating system thereon (one heat treated after deposition and the other not heat treated) appear to the naked human eye to look substantially the same when viewed from the glass side of the product (i.e. looking through at least one substrate of glass before viewing the coating). Thus, it will be appreciated that values ΔE* and Δa* are important in determining whether or not there is matchability, or substantial matchability, between a HT and non-HT product having the same coating (or between a given product before compared to after it has been HT). Note that color herein is described by reference to the conventional a*, b* values, and the term Δa* is simply indicative of how much color value a* changes due to heat treatment (HT). Thus, ΔE* is calculated in a known manner using the CIE LAB Scale L*, a*, b* values which are known. In particular, $$\Delta E^* = [(\Delta L^*)^2 + (\Delta a^*)^2 + (\Delta b^*)^2]^{1/2} \quad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

where the subscript "o" represents the coating (coated article) before heat treatment and the subscript "1" represents the coating (coated article) after heat treatment; and the numbers employed (e.g., a*, b*, L*) are those calculated by the aforesaid (CIE LAB 1976) L*, a*, b* coordinate technique.

In certain embodiments of this invention, coated articles herein provided on clear monolithic glass substrates have color as follows before heat treatment, as viewed from the glass side of the coated article ($R_G$%):

TABLE 2

Color ($R_G$) Before Heat Treatment (Monolithic)

| | General | Preferred |
|---|---|---|
| a* | −2.5 to +2.0 | −1.5 to +0.7 |
| b* | −10.0 to +2.0 | −9.0 to −1.0 |

After heat treatment, in certain embodiments of this invention layer systems provided on clear monolithic glass substrates have color characteristics ΔE* and Δa* as follows, when viewed from the glass (G) side (as opposed to the layer side) of the coated article:

TABLE 3

Color Characteristics ($\Delta E^*_G$ & $\Delta a^*_G$) After Heat Treatment (Monolithic)

| | General | Preferred |
|---|---|---|
| $\Delta E^*_G$ is | <=3.0 | <=2.5 (or <=2.0) |
| $\Delta a^*_G$ is | <=2.0 | <=1.5 |
| $\Delta b^*_G$ is | <=2.0 | <=1.0 (or <=0.7) |

Accordingly, as shown in Table 3 above, monolithic coated articles according to certain embodiments of this invention have a ΔE* value (glass side) of no greater than 3.0, more preferably no greater than 2.5, and even more preferably no greater than 2.0; and have a Δa* value (glass side) of no greater than about 2.0, more preferably no greater than 1.5. These same values may also be applied to IG units. When one or both of these are achieved, matchability may result. In certain example embodiments, it is noted that b* values are not deemed as important as a* values, because a* changes are believed to be more noticeable to the naked human eye than are b* changes in certain instances. However, Δb* values (glass side) are also low in certain example instances as set forth above.

Table 4 below sets forth example characteristics of monolithic coated articles according to example embodiments of this invention. The values in Table 4 apply to non-HT and/or HT products, except that ΔE* is applicable only to HT products, and assume a clear substrate for purposes of example only.

TABLE 4

Example Characteristics (Monolithic)

| Value/Measurement | Range | More Preferred | Most Preferred |
|---|---|---|---|
| Transmission (TY) %: | 45-70% | 50-65% | 53-61% |
| $L^*_T$: | 70-90 | 73-85 | 77-83 |
| $a^*_T$: | −10 to +2 | −8 to 0 | −6 to −2 |
| $b^*_T$: | −8 to +8 | −5 to +5 | −3 to +3 |
| Reflectance as viewed from | | | |
| glass (G) side: $R_G Y$ (%): | 15-30% | 17-28% | 19-25% |
| $L^*_G$: | 45-70 | 48-65 | 50-60 |
| $a^*_G$: | −5 to +3 | −2.5 to +2 | −1.5 to +0.7 |
| $b^*_G$: | −10 to +2 | −9 to −1 | −3 to −8 |
| ΔE* (i.e., from glass (G) side): | <=3.0 | <=2.5 | <=2.25 or 2.0 |
| Reflectance as viewed from | | | |
| film/coating (F) side: | <=12% | <=10% | <=9% |
| $R_F Y$ (%): | | | |
| $L^*_F$: | <=45 | <=40 | <=38 |
| $a^*_F$: | −10 to +20 | −5 to +15 | 0 to +10 |
| $b^*_F$: | −25 to +10 | −20 to 0 | −18 to −10 |
| $R_s$ (sheet resistance in ohms/sq.) | <=20 | <=7 or 6 | <=5 |
| T780 | 28-38 | 30-36 | 31-35 |
| Total Solar T % ($T_{solar}$): | n/a | | |
| U Value: | n/a | | |
| SHGC: | <=.41 | <=.40 | <=.39 or .38 |
| $T_{vis}$/SHGC ratio: | >=135 | >=140 | >=145 or 148 |
| SF % (g-value): | n/a | | |
| $E_h$ (hemispherical emittance): | <=0.08 | <=0.07 | <=0.06 |

Table 5 below sets forth example characteristics of monolithic coated articles according to example embodiments of this invention, in the context of IG window units (e.g., see FIG. 2).

TABLE 5

Example Characteristics (IG Unit)

| Value/Measurement | Range | More Preferred | Most Preferred |
|---|---|---|---|
| Transmission (TY) %: | 40-65% | 47-60% | 49-56% |
| $L^*_T$: | 67-87 | 70-82 | 74-80 |
| $a^*_T$: | −10 to +2 | −8 to 0 | −7 to −3 |
| $b^*_T$: | −5 to +5 | −3 to +3 | −2 to +2 |
| Reflectance as viewed from glass (G) side: $R_GY$ (%): | 18-32% | 20-27% | 22-26% |
| $L^*_G$: | 48-73 | 51-68 | 52-60 |
| $a^*_G$: | −6 to +2 | −3 to +1 | −2.5 to 0 |
| $b^*_G$: | −10 to +2 | −9 to −1 | −3 to −8 |
| ΔE* (i.e., from glass (G) side): | <=3.0 | <=2.5 | <=2.25 or 2.0 |
| Reflectance as viewed from film/coating (F) side: $R_FY$ (%): | <=19% | <=18% | <=16% |
| $L^*_F$: | <=55 | <=50 | <=48 |
| $a^*_F$: | −10 to +15 | −5 to +10 | 0 to +8 |
| $b^*_F$: | −18 to +5 | −15 to 0 | −12 to −4 |
| $R_s$ (sheet resistance in ohms/sq.) | <=20 | <=7 or 6 | <=5 |
| Total Solar T % ($T_{solar}$): | 24-31 | 25-30 | 25-29 |
| U Value: | 0.27-.34 | .28-.33 | .29-.31 |
| SHGC: | <=.36 | <=.35 | <=.34 or .33 |
| $T_{vis}$/SHGC ratio: | >=140 | >=145 | >=150 or 153 |
| SF % (g-value): | <=40 | <=38 | <=36 |
| $E_h$ (hemispherical emittance): | <=0.08 | <=0.07 | <=0.06 |

Examples 1-4

Four example coated articles are set forth in FIG. 3. Each of these examples had a layer stack of: glass/$Si_3N_4$/NiCr/Ag/NiCr/$Si_3N_4$, and the thicknesses of the layers are set forth in FIG. 3 in units of nm. Note that no titanium oxide (TiO2) layer was present in any of these example as the bottom-most layer, although this is possible in certain instances. The data relating to Examples 1-4 is also set forth in FIG. 3, both with respect to monolithic (mono) and IG unit (IGU). The glass substrates in these examples were about 6 mm thick and were clear. The data in FIG. 3 was taken prior to optional HT.

The $T_{vis}$/SHGC ratio is a function of the number of Ag or Au based IR reflecting layers. For instances, if there were two IR reflecting layers, the ratio would be significantly higher (e.g., 190 (or 195) or above for two silver IR reflecting layers).

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_xY$ or $R_x$ (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

The terms "heat treatment" and "heat treating" as used herein mean heating the article to a temperature sufficient to enabling thermal tempering, bending, or heat strengthening of the glass inclusive article. This definition includes, for example, heating a coated article using temperature(s) of at least about 550 degrees C., more preferably at least about 580 or 600 degrees C., for a sufficient period to enable tempering or heat bending.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. An insulating glass (IG) window unit comprising:
   first and second substrates coupled to each so as to form an insulating space therebetween;
   a layer system supported by at least one of the substrates proximate the insulating space, said layer system comprising an infrared (IR) reflecting layer comprising silver located between at least first and second dielectric layers which comprise silicon nitride, the first layer comprising silicon nitride being closer to the substrate supporting the layer system than is the second layer comprising silicon nitride, wherein said layer system includes only one IR reflecting layer comprising silver;
   wherein the IG window unit has a visible transmission ($T_{vis}$) of 47-60%, a SHGC of no greater than 0.36, and a $T_{vis}$/SHGC ratio of at least 140; and
   wherein said layer system comprises the following recited layers with the following thickness ranges:

| | |
   |---|---|
   | first layer comprising silicon nitride: | 150-900 Å thick |
   | first Ni and/or NiCr inclusive layer: | 10-80 Å thick |
   | the IR reflecting layer comprising silver: | 90-200 Å thick |
   | second Ni and/or NiCr inclusive layer: | 10-80 Å thick |
   | second silicon nitride inclusive layer: | 400-600 Å thick; | wherein the first layer comprising silicon nitride is located between the substrate supporting the layer system and the first Ni and/or NiCr inclusive layer.

2. The IG window unit of claim 1, wherein the IG window unit has a $T_{vis}$/SHGC ratio of at least 145.

3. The IG window unit of claim 1 wherein the IG window unit has a $T_{vis}$/SHGC ratio of at least 150.

4. The IG window unit of claim 1, wherein the IG window unit has a $T_{vis}$/SHGC ratio of at least 153.

5. The IG window unit of claim 1, wherein the IG window unit has a visible transmission ($T_{vis}$) of 49-56%.

6. The IG window unit of claim 1, wherein the IG window unit has an SHGC of no greater than 0.35.

7. The IG window unit of claim 1, wherein the IG window unit has an SHGC of no greater than 0.34.

8. The IG window unit of claim 1, wherein the glass substrate with the layer system thereon is heat treated, and the heat treated glass substrate and layer system have a ΔE* value (glass side reflective) of no greater than 3.0 after or due to heat treatment of the glass substrate with the layer system thereon.

* * * * *